March 19, 1957 H. B. VINCENT ET AL 2,785,820
CONTROLLING IMPLOSIONS IN CATHODE RAY AND OTHER TUBES
Filed June 28, 1952
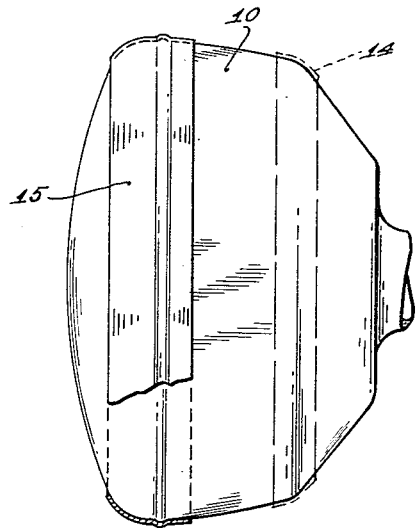
FIG-1-
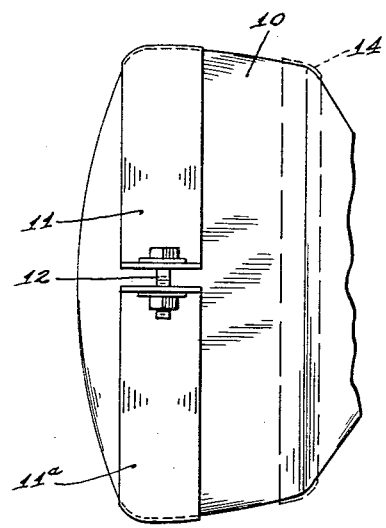
FIG-3-
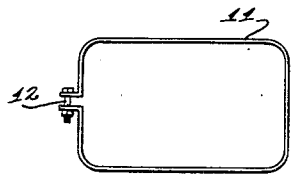
FIG-4-
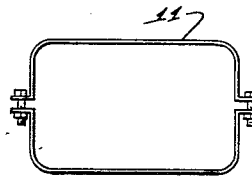
FIG-5-
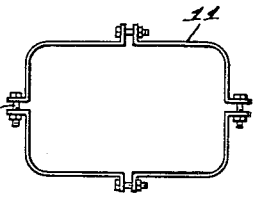
FIG-6-
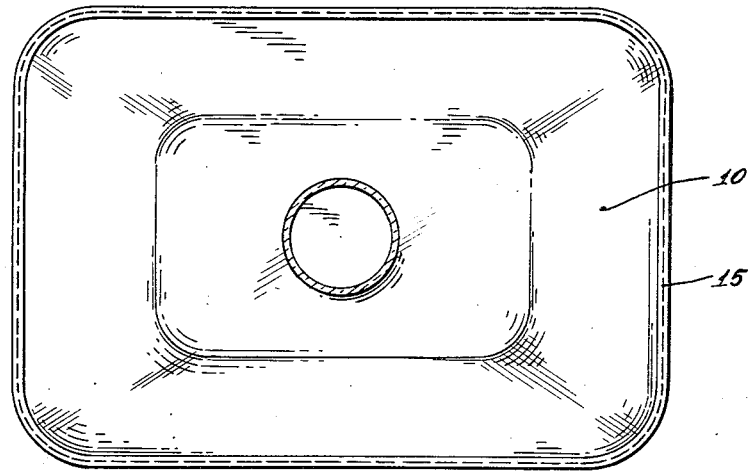
FIG-2-
INVENTORS:
HARVARD B.VINCENT
JAMES A.LOGUE
BY
Rule & Hoge
ATTYS.

United States Patent Office 2,785,820
Patented Mar. 19, 1957

2,785,820

CONTROLLING IMPLOSIONS IN CATHODE RAY AND OTHER TUBES

Harvard B. Vincent and James A. Logue, Toledo, Ohio, assignors to Owens-Illinois Glass Company, a corporation of Ohio Application June 28, 1952, Serial No. 296,122

5 Claims. (Cl. 220—2.1)

This invention relates to the control and prevention of implosions in evacuated and sealed glass television cathode ray or other types of sealed tubes or articles, and also to the accomplishing of other desirable end results.

In this present invention the theory of controlling implosion in vacuumized tubes is contemplated as one that extends through the range from, (a) providing a fracture restraining action which is over and above that normally supplied by normally annealed glass itself to (b) one wherein an accentuated restraint is provided in or upon the glass wall at or prior to fracture and wherein said restraint apparently has increased effectiveness both upon and subsequent to fracture of the glass.

As a development of this theory we state that there are two methods of providing fracture restraint in a cathode ray envelope, one is the cementing or adhering of a band to a tube by the use of some adhesive together with mechanical adjustment of the band to the tube to control thereby the application of pressure thereto, and the other is the thermal shrinking of a band upon a tube to form or obtain either a mechanical or an actual physical bond with the glass.

A band that is cemented or adhered to the glass, that is, that type of band where there is no physical contraction of the band but screw adjustment thereof, in order to fasten it to the tube under applied pressure, provides a means to restrain the effect of expansivity of the tube upon fracture, thus in effect applying a mechanical controlling or restraining action upon the rate at which a fracture may grow or proceed from its point or source of origin. However, this screw adjustment of the band does provide a certain degree of compression in the glass.

In the situation where a band is shrunk into place, that is, where the restraining action is accentuated over and above that normal to the glass and is one of a constantly applied force of an almost constant degree, the situation is slightly different. In this instance, the restraining action of the band at its inception is of a greater degree and actually is effective in presenting increased resistance to actual fracture of the glass. Because of this added resistance, the restraint or control of the growth or rate of procedure of a fracture through the glass is of a high and controlled degree at the inception of the fracture, and this restraint, resistance to or control of the rate of travel or procedure of a fracture increases with the increase in degree or number of fractures occurring in the tube. In either type of band the basic theory is the same, namely the restraint or control of the rate of growth of a fracture in the glass forming the walls of the tube.

The primary object of this invention is the provision of a fracture growth or resistance means in an unsealed or a sealed and evacuated hollow glass article which will eliminate or obviate the forces of implosion in such articles.

A further object is the production of such glass articles with such a degree of resistance present that they may be handled safely yet more roughly than is ordinary and without breakage.

Another object is to permit production of such glass articles of much less weight but yet capable of withstanding the abuse of handling.

Other objects will be apparent from the following specification.

Many and various types of tubes may be made from glass in accordance with this present invention, but our particular interest is the production of glass cathode ray or television picture tubes in accordance therewith.

During the manufacture and assembly of such tubes they eventually reach the point where they are evacuated to a high degree of vacuum, such as is commercially feasible and with the resultant effect of creating high surface pressures over the entire surface areas of the tubes. Because these tubes are made of glass and hence have certain degrees of frangibility which may become increased under evacuation they thus inherently become potential means of destructive power.

It can readily be appreciated that under fracture and the resultant implosion when such high pressure is released and converted into a driving force, behind a fragment of broken glass, that substantial velocities will be attained by such fragment.

In the processing or assembling of television tubes, it is necessary that they be handled numerous times, either by hand or mechanically, either of which presents the hazard of scratching and/or bumping. Either of these hazards, as well as others, produce a situation wherein or whereby the tube may be weakened and/or fractured either at the instant it is so subjected or possibly at a later time.

In this finishing of these tubes they become sealed containers or glass articles which have been vacuumized to the extent that a high vacuum exists therein. Under such conditions it should be apparent that in a 27" rectangular tube, for example, the face portion alone presents a surface area of approximately 400 square inches which results in a surface face pressure of approximately 5800# and which under fracture or breakage is capable of causing implosion.

Such implosions can and do occur during the final processing stage of the tube assembly thereby causing damage not only to the mechanical assembly equipment but also to the adjacent tubes. Also an occasional implosion occurs after the television set is in the hands of the public and in such instances the exploded glass fragments become destructive in effect. The damage range of the fragments from such implosions may be on the order of approximately twenty to twenty-five feet or greater.

As a consequence of the loss during fabrication from such implosions great effort has been concentrated upon strengthening these tubes in many and various ways.

Proceeding from this point metal bands were actually weld sealed to the rim edge of circular tubes and it was found that under ordinary circumstances implosion was prevented, except under extreme impact, scratch, etc., and that when it did occur there was no flying or violent throwing of fragments of glass. The tubes simply appear to collapse upon themselves.

It was discovered that an extremely tight mechanical or physical grasping or bonding of the rim or surface of the tube should give desirable results. Carbon-steel bands were obtained and by causing a shrink fit of these bands upon the side wall or rim of the glass tube excellent prevention of implosion is obtained. Also, if the tube is fractured there is little or no flying of the pieces of glass.

When these compression bands are shrunk onto the rims of the tube, or a compression band is otherwise provided, it is necessary in any instance that they be so attached or provided in or upon the tube as to supply additional compression of a continuous nature in the glass forming the walls or rim of the tube at or beneath said band. This additional compression, being in excess of that normal to the glass surface without the provided compression member or band, thereby functions to repress, repel or limit the rate of travel at which any fracture, occurring in the face or side wall of the tube, may proceed from its source and it is because of this resistance, limiting or control of this speed or rate of fraction procedure that the violence of implosion is controlled, reduced and eliminated.

In addition this added compression in the rim, side walls and face tends to control the direction of fracture, break or crack. It is observed that a crack will start from some impact point, move toward the compression band, then be deflected and move away from this high compression area. Such deflection means of course that fractures originating on opposite sides of the compression band find it difficult, if not impossible, to cross over and reach each other and merge to thereby form a complete fragmentation or collapse of the tube.

From the preceding it should be quite apparent that through the application of this implosion band the surface area of the tube has, in effect, been defined into at least two juxtaposed compression zones by the generation of an encompassing line or band of higher compression which circumscribes the tube at one or more points on its periphery. Therefore, any fracture that orginates in either opposing zone is either stopped at this line of higher compression or deflected thereby thus preventing a merger of any such fractures.

Also this band of high compression makes it difficult for any fracture to overcome such force and consequently its inherent tendency to travel or proceed at high speed is restrained and controlled and the closer the fracture gets to this compression band the greater the resistance it meets. Consequently its rate of procedure, growth or generation becomes slower and slower and in many cases actually fails to enter into the compression band area.

Further this high compression area will be found to actually deflect or turn away fractures, i. e., they will proceed to within a certain distance of this band of increased or high compression and then be turned or deflected to one side and proceed back into an area of lesser compression. These tubes may be annealed prior to or subsequent to the application of this compression band depending of course upon the method or procedure to be followed in applying the said band.

The higher compression zone includes the area directly beneath or contacted by the compression band, and merges into the two separate zones of lower compression by a gradual decrease in the compression in a direction outwardly from the compression band. Apparently this area of diminishing compression is confined to a comparatively narrow zone surrounding the compression band, without any distinct line to mark the physical boundaries of the zones of higher and lower compression.

In the accompanying drawings there is shown one embodiment of the invention in which:

Fig. 1 is a side elevational view showing an assembled tube and band;

Fig. 2 is a rear view of the tube showing a continuous band;

Fig. 3 is a side elevational view of a tube showing a band as clamped around the tube; and Figs. 4 to 6, both inclusive, illustrate various types of band structures.

In the type of television tube we are here discussing it is quite possible and very likely that the implosion band will be assembled thereon or incorporated therein prior to any other finishing operation thereon, such as phosphor coating the inside of the face, etc. However, the utility of the implosion band 11 is, so far as this present invention is concerned, not only present during and subsequent to the evacuation and sealing of the tube 10, but it also functions to increase fracture resistance in an unevacuated tube.

In Fig. 3 of the drawings a tube 10 is shown as it would appear in final finished form with one type or form of the implosion band 11 assembled in place. The band 11 as here shown is made in two pieces 11 and 11a joined by clamping bolts 12.

This band 11 may be made of ferrous metals such as carbon steel and stainless steel, an alloy of ferrous metals, non-ferrous metals such as aluminum, an alloy of non-ferrous metals or a combination of ferrous and non-ferrous metals. Actually the band 11 may be composed of any material capable of withstanding the rigors to which these tubes are subjected during final preparation and may be of either organic, inorganic or other derivation. For example, if these tubes 10 at some future time may be finally completed without it being necessary to subject them to fairly high temperatures then the band 11 may be a plastic, a resin or other so-called low temperature material either in strip, sprayed or other form, providing of course, that any such materials have the required tensile strength and other properties obviously necessary for the specified purpose.

The present method demands the subjection of these tubes 10, during their final preparation and sealing, to temperatures in excess of those at which usual resins, plastics or other low temperature materials would function properly and as a consequence resort has been made to metal bands. However, there are certain resins which might be used.

As an example of metal bands the low carbon steel materials have desirable thermal and other characteristics for this situation although other metals could and will be utilized. Such metal bands may be electrically grounded in use.

As indicated in Figs. 2, 4, 5, and 6 these bands may be made in several forms, i. e., Fig. 2 welded into a single piece; Fig. 4 a bolted joint single piece; Fig. 5 a bolted joint two-piece band; Fig. 6 a bolted joint four-piece band; a band split into any desired number of pieces or a band stamped out or otherwise formed as a single piece.

The exact theory behind this invention is not completely and definitely understood but it is believed the essential theory here involved, in order to provide the ultimate or desired degree of fracture restraint in a television picture tube, is through the application of a band 11 of any desired width, which will circumscribe a peripheral line around and in pressure contact with an outer surface area of tube 10, said band generating and constantly maintaining therebeneath a localized area of compression of an increased degree over that normal to the glass and extending around the said periphery of the tube in such manner as to define, in the said surface area of said tube, at least two zones of compression and with the compression in the said localized area of said band being of an order at least greater than that of any said defined zone. The two zones of compression above mentioned comprise the two areas of the tube separated by the band 11, namely the face plate of the picture tube 10 and the body portion or so-called funnel. The portion underlying the band 11 and subjected to the direct pressure of the band forms a third zone of compression, this zone of greater pressure merging into the two zones of lesser compression along or near the boundary lines of the compression band 11.

In order to obtain the desired type of restraint at or upon fracture of the glass, i. e., one which becomes highly effective at or subsequent to fracture, the bands 11 may be applied as follows.

The inside surface of band 11, as shown in Fig. 2, may be coated with one of the well known commercial adhesives or cements capable of standing up under temperatures of from 750°–1000° F. or the cement may be applied to the wall of the tube 10. Thereafter the band 11 is placed in position on the tube side wall and the cement permitted to set.

In this instant procedure, as outlined immediately above, the band 11 may be either metal bands or tapes of other known materials capable of withstanding the required temperatures.

Such bands as above described are, in most instances, the type wherein the fracture restraint becomes highly effective immediately upon impact of fracture and of course the degree of fracture restraint is limited by the degree of expansion occurring due to fracture and the degree of restraint obtained by adjustment of the band. However, such restraint is such as to restrain or slow down the rate of procedure or travel of fractures and is present at the impact.

A further procedure in attaching a metal band 11, for example, of the type shown in Fig. 5, would be to position the band 11 upon tube 10 as shown in Fig. 1, after subjecting the band 11 to heat, as from an acetylene torch or otherwise, to expand same and then tightening bolts 12 while said band is so heated.

After such heating of the band 11 and tightening of bolts 12 the band is then allowed to cool, either naturally or by acceleration and as it cools it shrinks and applies a localized compressive force to the glass wall of tube 10 and with said compressive force localized beneath the band and in a peripheral line around the tube 10. Such a band may be formed in one, two or more sections as shown in Figs. 3 to 6 inclusive.

A single piece metal band 15 (Fig. 2) may be formed either by stamping or welding and it may be formed with inside dimensions less than that of the outside wall or rim dimensions of the glass tube 10 when at room temperature.

Then by heating the metal band and expanding same it may be positioned over the normally smaller dimensioned glass tube 10 and allowed to cool. When the band 15 has reached room temperature, it will have contracted substantially, and depending upon the dimensional differences between the band 15 and tube 10, at room temperature, there will be generated a constant and controlled compression in the glass at and about the band 15.

A band of glass may also be utilized to accomplish like results.

Also molten or plastic metal or other materials may be projected upon the glass wall of the tube 10 to accomplish the desired results.

A further manner by which this compression band may be joined with the tube to produce the compressive forces which prevent or control implosion, is to mold the glass with the metal band properly positioned in the mold. If the band, for example, is of carbon-steel its coefficient of contraction will be much greater than that of the glass and as the metal increases in temperature, due to contact with the hot glass, it will form in effect either a mechanical, physical or chemical bond with the glass. The carbon steel in this situation will lose temperature at approximately the same rate as the glass, because of their being in intimate contact, but the total contraction of the steel will be greater than that of the glass. Therefore as they reach a stable temperature a high degree of compression will have been set up in the glass wall beneath and abutting the steel band due to the great difference in the contraction characteristics of the band and the glass.

This generated compression zone or area will be of such order, that when the tube is later evacuated, it will still be of such degree as to provide the desired resistance to the rate of procedure of a crack or fracture through the glass wall. However, other metals or materials may be used wherein the contraction characteristics may approximately match that of the glass in the tube 10 and yet the restraining action of any such band 11 will control or restrain the rate of procedure of any generated or impact fracture.

Under certain circumstances a second band may be utilized as shown by the dotted line member 14 but under normal circumstances it appears that a single band will supply sufficient resistance to the implosive forces to counteract their destructive violence.

In whatever manner such bands, or other means, are applied to the tube 10, the end result of such application must be the supplying of sufficient resistance, to obviate the projecting of fragments under great force and velocity when such tube is fractured from any cause.

Thus a formed metal band 11 or 15 may be molded in place; adjusted or shrunk on by heat; molten or plastic metal or other materials may be projected upon the surface of the tube 10 in band form and in controlled quantity; plastic or resin bands or bands of other materials capable of generating the required compressive resistance to implosion may be applied to the tube 10 either alone or with an adhesive. In any instance it appears that regardless of whether the band 11 or 15 is adhered in place, shrunk in place, welded in place or mechanically bonded in place or otherwise provided, it must provide a condition whereby an increase in the fracture resistance thereunder or at or about this point exists to an extent sufficient to resist fracture generation in the glass and its subsequent procedure or rate of travel.

Further, the addition of such bands will permit a reduction in the thickness of the walls of the tube and such reduction will result in increasing both the speed of forming of the glass portions and also the final processing of the tubes.

From the preceding it should be quite apparent that the essence of this invention is to provide a resistance to fracture in glass articles wherein such resistance is of the form or type whereby the rate of travel or expansion of any given fracture may be slowed down to the point where violent implosion is obviated.

The terms "compression band" or "compression member" as used herein are defined as applying to any type of band applied for the purpose of restraining the rate of procedure or travel of a fracture in the walls of the glass article regardless of whether such restraint is in effect prior to or subsequent to the actual fracture.

Modifications may be resorted to within the spirit and scope of the appended claims.

What we claim is:

1. A television picture tube comprising a hollow glass body and a face plate hermetically sealed to said body, the contacting surfaces of the said body and face plate being in a plane sustantially perpendicular to the adjoining exterior surface portions of the said body and face plate, said tube being vacuumized and thereby placing the exterior surface thereof under compression, a band surrounding said body at said plane and overlying and in contact with said adjoining surface portions throughout the periphery of the tube, and means for maintaining said band under a continuous tension by which a continuous compressive force is applied to the said exterior surface portions of the tube, thereby producing an increased compression of the exterior surface of the tube in zones defined by the area of the tube underlying said band and merging into the surrounding areas of said zones.

2. The article defined in claim 1, said band consisting of a metal shrunk onto the article.

3. The article defined in claim 1, said band being made in sections, and clamping bolts connecting said sections and operable to adjustably apply tension to the band and thereby maintaining an adjusted pressure of the band on said article.

4. A television picture tube comprised of a pair of hollow glass parts hermetically sealed together, the sealing plane between the said hollow glass parts being in a plane substantially perpendicular to the adjoining exterior surface portions of the said glass parts and extending throughout the periphery of said tube, said tube being vacuumized and thereby placing the exterior surface portions thereof under compression, a band surrounding said body at said sealing plane and overlying and in contact with said adjoining exterior surface portions throughout the periphery of the tube, and means for maintaining said band under a continuous tension thereby producing an increased compression in the said exterior surface portions of the tube and in the zones external of that defined by the area of the tube underlying said band.

5. A television picture tube comprised of a pair of hollow glass parts hermetically fused together, the fusing area between the said hollow glass parts being in a plane substantially perpendicular to the adjoining exterior surface portions of the said glass parts and extending throughout the periphery of said tube, said tube being vacuumized and thereby placing the exterior surface portions thereof under compression, a band surrounding said body at said fusing plane and overlying and in contact with said adjoining exterior surface portions throughout the periphery of the tube, and means for maintaining said band under a continuous tension thereby producing an increased compression in the said exterior surface portions of the tube and in the zones external of that defined by the area of the tube underlying said band.

References Cited in the file of this patent

UNITED STATES PATENTS

| | | |
|---|---|---|
| 1,184,813 | Birdsall | May 30, 1916 |
| 1,583,677 | Edelmann | May 4, 1926 |
| 1,727,755 | Dickinson | Sept. 10, 1929 |
| 1,748,138 | McBride | Feb. 23, 1930 |
| 2,003,625 | Boyer | June 4, 1935 |
| 2,160,434 | Harris | May 30, 1939 |
| 2,180,992 | Meyers | Nov. 21, 1939 |
| 2,222,197 | Engels | Nov. 19, 1940 |

FOREIGN PATENTS

| | | |
|---|---|---|
| 342,945 | Great Britain | Feb. 21, 1931 |